US006932099B2

(12) United States Patent
Mahaney

(10) Patent No.: US 6,932,099 B2
(45) Date of Patent: Aug. 23, 2005

(54) CONFIGURABLE VALVE-ELECTRICAL BOX FOR UNDERGROUND CONDUIT SYSTEM TO DISTRIBUTE WATER TO LANDSCAPING

(76) Inventor: Mark B. Mahaney, 8883 E. Rusty Spur Pl., Scottsdale, AZ (US) 85255

( * ) Notice: Subject to any disclaimer, the term of this patent is extended or adjusted under 35 U.S.C. 154(b) by 0 days.

(21) Appl. No.: 10/444,557

(22) Filed: May 23, 2003

(65) Prior Publication Data
US 2004/0231724 A1 Nov. 25, 2004

(51) Int. Cl.[7] .............................................. F16K 51/00
(52) U.S. Cl. ..................... 137/15.08; 137/364; 137/371; 137/559; 239/201; 239/285; 405/36; 405/303
(58) Field of Search ................................. 137/363, 364, 137/371, 559, 15.08; 239/201, 285; 405/36, 303

(56) References Cited

U.S. PATENT DOCUMENTS

| 1,964,034 | A | * | 6/1934 | Cook ........................... 417/36 |
| 4,822,213 | A | * | 4/1989 | Grace et al. ................. 405/303 |
| 4,872,575 | A | * | 10/1989 | Kobilan ....................... 220/3.3 |
| 5,908,157 | A | * | 6/1999 | Antonellis et al. ............ 239/70 |
| 6,460,563 | B2 | * | 10/2002 | Olson et al. ................. 137/364 |

* cited by examiner

Primary Examiner—A. Michael Chambers
(74) Attorney, Agent, or Firm—Tod R. Nissle, P.C.

(57) ABSTRACT

An improved landscape watering system is provided that simplifies the installation and maintenance of multiple underground water control valves, that permits the on-site configuration of valve-electrical boxes, that limits egress of insects and other living creatures into a valve-electrical boxes, and that facilitates labeling of a valve-electrical box. The box includes configurable, sealable openings and a water permeable bottom that prevents egress of insects and other living creatures.

9 Claims, 3 Drawing Sheets

CONFIGURABLE VALVE-ELECTRICAL BOX FOR UNDERGROUND CONDUIT SYSTEM TO DISTRIBUTE WATER TO LANDSCAPING

This invention pertains to systems for delivering water to landscaping.

More particularly, the invention pertains to an underground conduit system that delivers water to landscaping and that includes underground valves and electrical lines used to distribute water to various conduits in the system.

In a further respect, the invention pertains to a valve-electrical box that houses valves and electrical lines underground and that is incorporated in a water delivery system of the type described.

In another respect, the invention pertains to a valve-electrical box that is configurable on-site to permit various combinations of valves and electrical lines to be housed in the valve-electrical box.

In still a further respect, the invention pertains to a valve-electrical box that significantly reduces the likelihood that insects and reptiles can inhabit the box and that reduces the likelihood that dirt-moisture mixtures will contact and degrade or damage valves and electrical wiring in the valve-electrical box.

A conventional lawn sprinkler system includes a plurality of underground water conduits. The conduits extend and branch from at least one valve. The proximate end of at least one of the conduits is connected to the valve. The valve is connected to a pressurized water line. Sprinkler heads, drip irrigation fittings, or other water distribution fittings are connected to the distal ends of the conduits. Apparatus is provided for opening and closing the valve. When the valve is opened, water from the pressurized line flows through the valve, through the conduits, and out through the sprinkler heads or drip irrigation fittings. The apparatus for opening and closing the valve can comprise a tool to open manually the valve, or can comprise a control box that is connected to the valve via electrical wiring. The control box can be manually operated to open and close the valve, or can be set to automatically open and close the valve at selected times.

The valve(s) is typically located underground and is housed in a conventional valve-electrical box. The box is typically fabricated from a polymer and includes two opposed generally parallel ends and two opposed generally parallel sides interconnecting the ends; i.e., the box is generally orthogonal. The box includes a lid, but does not include a bottom. Some boxes include an opening formed in each end to receive a conduit directed into the box to a valve positioned in the box. Some boxes do not include any openings formed in the sides or ends of the box.

The conventional valve-electrical box has disadvantages. First, the limited number of conduit openings (if any) formed in the box make it difficult to use the box to house multiple valves. A user either has to cut additional openings in the box, or, has to bring conduits into the box through the open bottom of the box. Second, the open bottom of the box facilitates the gradual upward displacement and accumulation of soil in the box around the valves and around any electrical wiring associated with the valves. When the soil become wet, the soil and moisture accelerate the corrosion of electrical wires and degradation of the valves. This is especially the case because as valves age, they tend to leak or cease to function. Third, the open bottom of the box facilitates the entry into the box of insects or mice. The presence of insects and mice can attract black widow spiders, scorpions, lizards, and snakes. Fourth, when the ground around the box settles, the box can tilt in the ground and actually work its way partially out of the ground. This facilitates the packing of soil around the valves and accelerates the degradation of the valves. Fifth, the box tends to be relatively small, making maintenance of the valves and other components in the box difficult. Sixth, the polymer used to construct the box makes it difficult to label the box with a marker, to glue labels to the polymer, or to brand the box with heated metal letters.

Accordingly, it would be highly desirable to provide an improved landscape watering system including a valve-electrical box that facilitates the installation of multiple valves, that facilitates the maintenance of valves and associated electrical components, that reduces the likelihood soil and other debris will accumulate in the box, that facilitates marking the box for purposes of maintenance and location of the box, and that minimizes the accumulation in the box of insects, mice, spiders, scorpions, and snakes.

Therefore, it is a principal object of the instant invention to provide an improved landscape watering system.

A further object of the invention is to provide an improved landscape watering system that simplifies the installation and maintenance of multiple underground water control valves.

Another object of the invention is to provide an improved valve-electrical box for a landscape watering system that can be readily configured on-site for a variety of valve arrangements.

Still a further object of the invention is to provide an improved valve-electrical box for a landscape watering system that simultaneously permits moisture to drain from the box while blocking the ingress of insects and other living creatures into the box.

Still another object of the invention is to provide an improved valve-electrical box for a landscape watering system that facilitates labeling of the box and identification of the valves in the box.

These and other, further and more specific objects and advantages of the invention will be apparent from the following detailed description of the invention, taken in conjunction with the drawings, in which.

Briefly, in accordance with my invention, I provide an improved method for installing a landscape watering system. The method includes the steps of providing a plurality of water conduits; providing a plurality of valves to direct water into the conduits; providing control apparatus to open and close the valves; providing electrical lines connected to the control apparatus to send signals to the valves to open and close the valves; providing a valve-electric box including a plurality of sides, a plurality of sealable openings each formed in one of the sides, and, a lid; excavating a hole in the ground; positioning the box in the hole; positioning the valves in the box; extending a first one of the conduits through a first selected one of the sealable openings such that the opening is substantially sealed; connecting a first one of the valves to the first one of the conduits; extending a second one of the conduits through a second selected one of the sealable openings such that the second selected opening is substantially sealed; connecting a second one of the valves to the second one of the conduits; connecting the control apparatus to the first and second valves; and, partially burying the box in the ground such that the lid can be removed to access the valves.

In another embodiment of the invention, I provide an improved method for installing a landscape watering system including the steps of providing a plurality of water conduits; providing a plurality of valves to direct water into the conduits; providing control apparatus to open and close the valves; providing electrical lines to send signals to the valves to open and close the valves; providing a valve-electric box including a plurality of sides, a plurality of openings each formed in one of the sides, a lid, and a perforate bottom; excavating a hole in the ground; positioning the box in the hole; positioning the valves in the box above the perforate bottom; extending a first one of the conduits through a first selected one of the openings such that the opening is substantially sealed; connecting a first one of the valves to the first one of the conduits; extending a second one of the conduits through a second selected one of the openings such that the second selected opening is substantially sealed; connecting a second one of the valves to the second one of the conduits; connecting the control apparatus to the first and second valves; directing the electrical lines through one of the openings into the box; and, partially burying the box in the ground such that the lid can be removed to access the valves.

Figure 1:
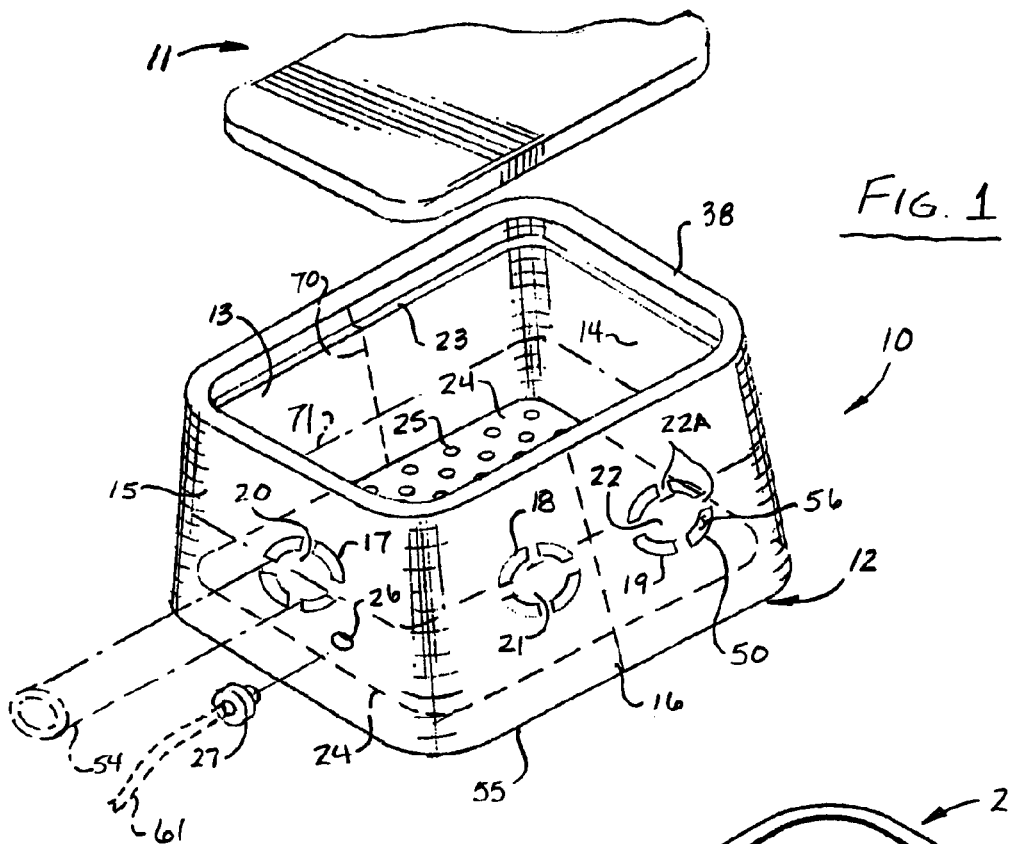
FIG. 1 is a perspective view illustrating a valve-electrical box for a landscape watering system constructed in accordance with the principles of the invention.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates a valve-electrical box generally indicated by reference character 10. Generally orthogonal box 10 includes a plurality of sides 13, 14, 15, 16; a lower peripheral edge 55; an upper peripheral edge 38; an inner lip 23; and, a lid 11 that removably seats on lip 23 within edge 38 in the manner illustrated in FIG. 5. Lid 11 can include an opening 46 formed therethrough to facilitate installation and removal of lid 11.

Bottom or floor panel 24 preferably, but not necessarily, includes perforations 25 that promote drainage of water from inside box 10 through bottom 24. In addition, bottom panel 24 is preferably, but not necessarily, spaced above edge 55. Spacing bottom panel 24 above edge 55 is preferred because when box 10 is set on level ground, bottom panel 24 is spaced above the ground and the open space intermediate the ground and bottom panel 24 facilitates the drainage of water from inside box 10 and reduces the likelihood that soil will pass through perforations 25 into box 10.

Figure 2:
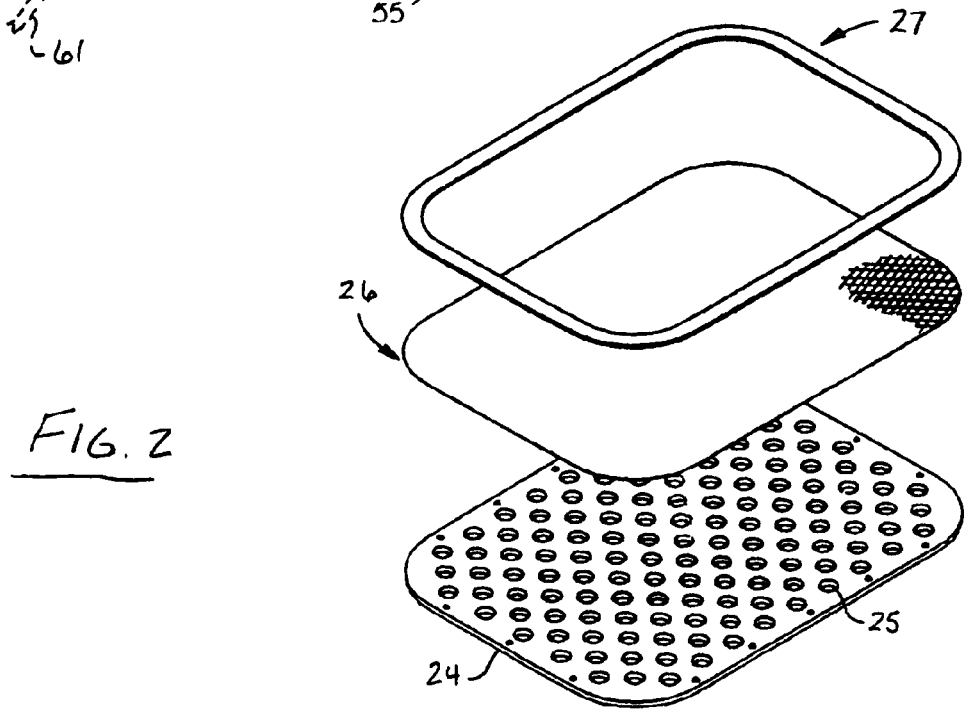
FIG. 2 is an exploded perspective view illustrating one floor assembly that can be used in the bottom of the box of FIG. 1.

An alternate construction for the bottom or floor of box 10 is illustrated in FIG. 2 where a sheet or pad 26 of water permeable filter fabric or filter paper or some other filter material is affixed on the top or on the bottom of and in registration with perforate panel 24. While sheet 26 preferably permits the passage of water, sheet 26 preferably also functions to block or impede the passage of soil through sheet 26. Border 27 overlays the peripheral edge of sheet 26 and is connected to panel 24 to secure sheet 26 in place on top of panel 24. If desired, sheet 26 can be affixed to the bottom of panel 24 instead of to the top of panel 24, or, sheet 26 can be affixed both to the top and the bottom of panel 24.

One or more knock-outs 20, 21, 22 can, if desired, be formed in each side 13 to 15. Other openings (with or without knock-outs) for conduit or wiring can be formed in box 10. In order to facilitate the installation in valve-electrical box 10 of multiple valves, it is preferred that each side 13,16 include at least two knock-outs and that each side 14, 15 include at least one knock-out.

Knock-out 22 includes fingers 22A. Knock-out 22 is scored or otherwise formed such that when a hammer or other tool is used to pound out knock-out 22 from side 16, the entire knock-out 22 (including fingers 22A) is removed, leaving a circular opening having a circular peripheral edge including edge portions 19, 50 and other edge portions. When knock-outs 21 and 20 are removed, a circular opening also results. In FIG. 1, the openings 56 in knock-outs 20 to 22 are drawn, for sake of clarity, to appear larger than normal. Score lines or other lines of weakening can be utilized in place of or in conjunction with openings 56 to form knock-outs 20 to 22.

Figure 3:
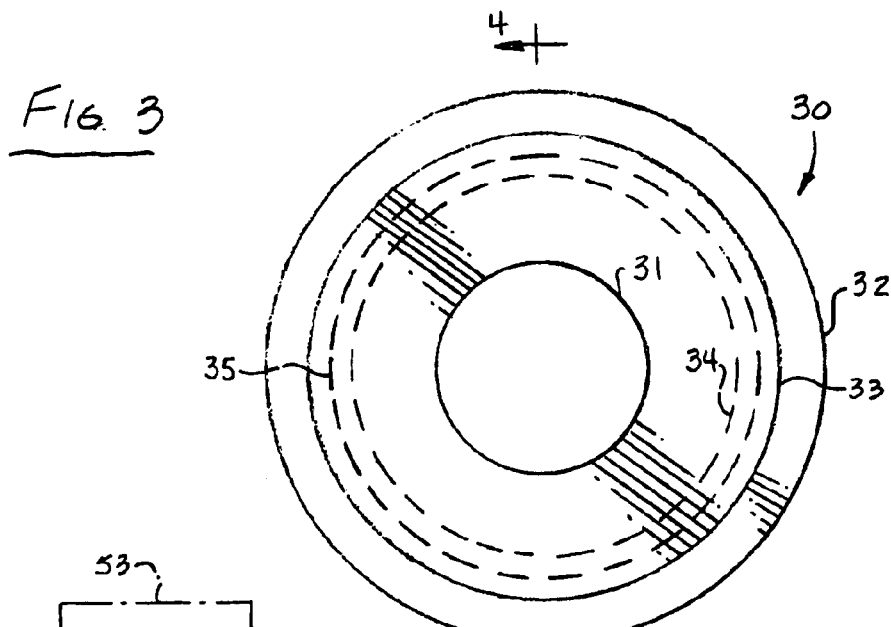
FIG. 3 is a front view illustrating a seal than can be utilized to seal conduit and wiring in conduit and wiring openings, respectively, formed in the box of FIG. 1.
Figure 4:
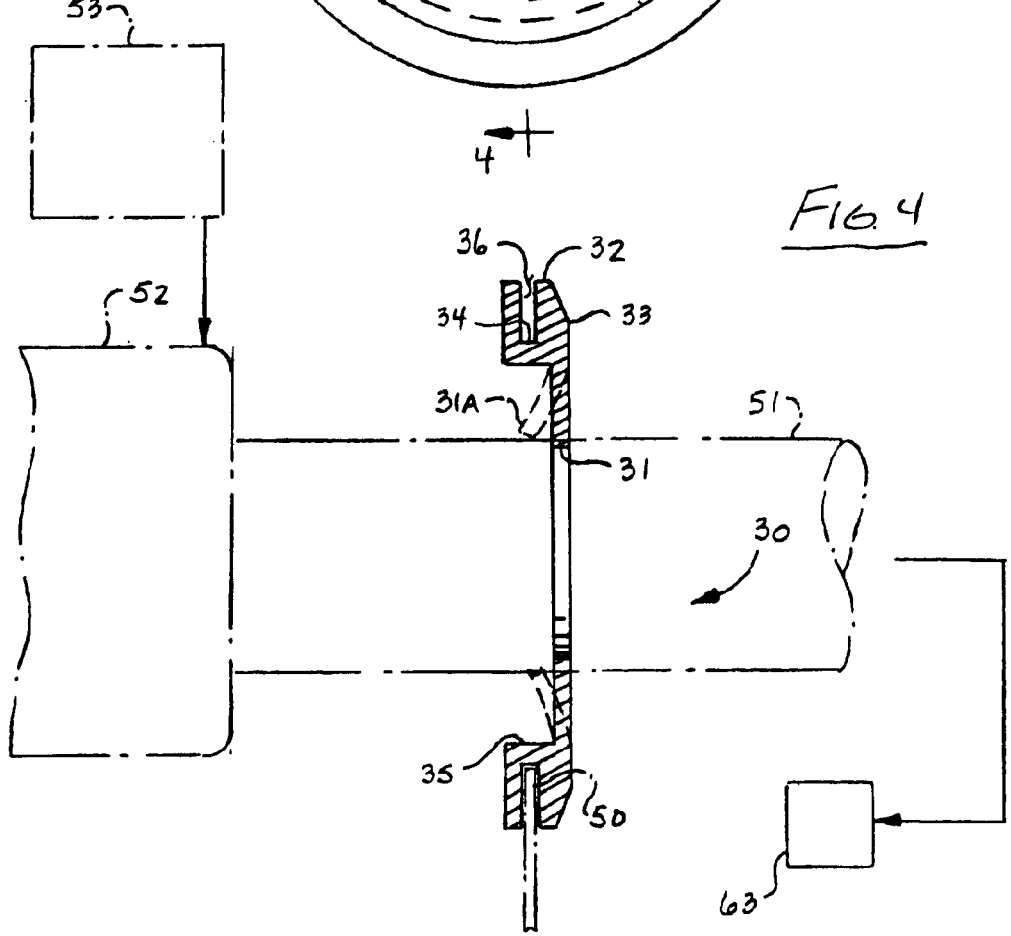
FIG. 4 is a side section view of the seal of FIG. 3 taken along section line 4—4 thereof and illustrating additional construction details thereof.

As noted, knock-outs need not be formed in sides 13 to 16. Instead, circular openings can be formed in sides 13 to 16 and caulk, plumbing fittings, or any other desired means can be provided to seal the openings either in the event a conduit does not pass through the opening or in the event a conduit does pass through the opening. The shape and dimension of an opening or knock-out can vary as desired. FIGS. 3 and 4 illustrate a circular seal 30 that can be placed in a circular opening formed in a side 16 of box 10. Seal 30 can be fabricated from any desired material, but preferably is fabricated from elastic, pliable rubber or another desired pliable and/or elastic material. Seal 30 includes inner circular opening 31, and cylindrical groove 34 defining a cylindrical opening 36 that sealingly fits over the circular edge 50 of a circular opening in a side 16 of box 10. Seal 30 also includes circular edge 33, edge 32, and inner cylindrical surface 35. When a conduit 51 having a diameter greater than that of opening 31 is forced through opening 31, portion 31A of seal 30 elastically sealingly distends in the manner indicated in FIG. 4.

Figure 5:
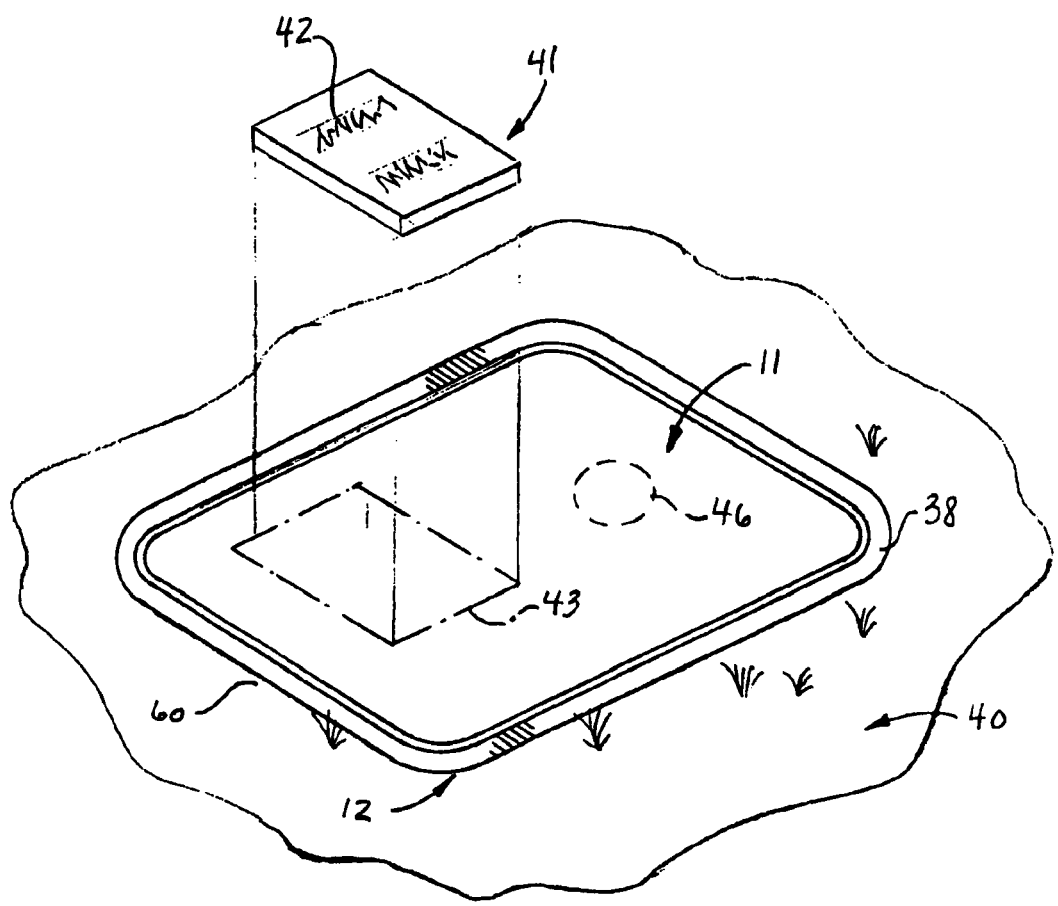
FIG. 5 is a perspective view of the box of FIG. 1 illustrating its installation in the ground and illustrating apparatus that can be utilized to mark the box to facilitate locating and maintenancing the box.

If desired, a seal 30 can be provided that does not include opening 31. In the event a conduit 51 is not directed through a circular opening in a side 16, such a seal can be placed in the opening to prevent soil from passing through the opening when box 10 is partially buried in the manner shown in FIG. 5. In FIG. 5, box 10 is partially buried in an opening 60 in the ground so that lid 11 can be removed from the lower portion 12 of box 10.

In FIG. 1, valves 52 are not, for the sake of clarity, illustrated in valve-electrical box 10. After knock-out 20 is removed, a conduit 54 is inserted therethrough and is connected to a valve or valves 52 in the lower portion 12 of box 10 to provide water under pressure to the valves. The pressurized water in conduit 54 typically is obtained from or provided by a municipal water supply. Grommet 27 fits into opening 26 and receives electrical wire(s) that are connected to each valve 52 when the valves are opened and closed by electrical signals from a control box 53.

In FIG. 4, when control box 53 is manually or automatically operated to open a valve 52, water from conduit 54 travels through valve 52 and through conduit 51 to a sprinkler head or other water distribution apparatus 63 attached to the distal end of conduit 51.

A marker panel 41 or other member can be attached to an area 43 on the outer top surface of lid 11. Panel 41 includes alphanumeric characters or other symbols 42 that identify box 10 and distinguish it from other boxes used in the same or adjoining landscape watering systems. For example, one box 10 can be labeled A1, another box 10 can be labeled A2, another box labeled A3, etc. The "A" in each label designation can indicate a particular landscape watering system, and the "1", "2", "3", etc. in each label designation can indicate the particular box in landscape watering system "A". The label designation 42 can also indicate the location of box 10 in a particular geographical area. For example, the designation can include the letters "SW" to indicate that the box 10 is location in the southwest portion of a section of land. Or, the designation 42 can correlate to a list that indicates the general location of the box 10. Such a list might, for example, state:

Box A1: SW (southwest) near west sidewalk.
Box A2: SW (southwest) near driveway.
Box A2: N (north) near path.
Box A3: S (south) near fire hydrant.

A marker panel 24 need not include symbols formed thereon but can be blank and permit symbols to be inscribed thereon with a pencil, pen, etching apparatus, or other desired apparatus.

Any desired means can be utilized to affix a panel or other member 41 to a designated area 43 of lid 11. Panel 41 can be affixed to lid 11 with adhesive, screws, etc. Panel 41 can include feet that snap into openings formed in lid 11. Panel 41 can slide into rails or slides formed on lid 11. And so on.

Valves in a box 10 can be constructed to be opened and closed manually, using a tool, or, can be opened and closed with electrical signals from a control box 53, or can be opened and closed using any other desired control system or mechanism.

In use, the configurable valve-electrical box 10 of FIG. 1 is provided, except that an additional pair of knock-outs are formed in side 13 and an additional knock-out is also formed in side 14. Also provided are a pair of valves 52, a conduit 54 to provide a supply of pressurized water, sprinkler heads, conduit to interconnect each sprinkler head with one of the valves 52, seals 30, and electrical wiring to interconnect the control box and the valves. Conduit 54 has a one inch outside diameter. The remaining conduit used to interconnect the sprinkler heads with the valves 52 has a three-quarter inch outside diameter. The opening 31 in each seal 30 has a five-eighths of an inch diameter. The shape and dimension of conduit 54 and seal 30 can vary as desired. A site is selected to install a landscape watering system. A location is selected for valve-electrical box 10. At the selected location, an opening is formed in the ground for box 10. Trenches are dug for conduit leading from the box 10 to each sprinkler head or other water distribution fitting. Box 10 is configured for two valves 52 by removing only knock-outs 20 to 22. A seal 30 is placed in each of the three circular opening produced by removing knock-outs 20 to 22. Valves 52 are placed in box 10 on top of panel 24. Conduit 54 is inserted through opening 31 in the seal 30 in the opening formed by removing knock-out 20, is branched (so it can be connected to each of the pair of valves 52) and is connected to each valve 52 in box 10. Conduit 54 provides pressurized water from a municipal water supply or some other source. Opening 31 in seal 30 pliably, elastic conforms to conduit 34 in the manner illustrated in FIG. 4. Conduit 51 is inserted through opening 31 in the seal 30 that is in the opening in box 10 that is formed by removing knock-out 22. One end of conduit 51 is connected to one valve 52 in configured box 10. The other end of conduit 51 is connected to a sprinkler head or other water distribution fitting or is connected to another conduit that transports water from conduit 51 to one or more sprinkler heads or other water distribution fittings. Another auxiliary conduit is inserted through opening 31 in the seal 30 that is in the opening in box 10 formed by removing knock-out 21. One end of the auxiliary conduit is connected to the other valve 52 in configured box 10. The other end of the auxiliary conduit is connected to a sprinkler head or other water distribution fitting or is connected to another conduit that transports water from the auxiliary conduit to one or more sprinkler heads or other water distribution fittings. The control box 53 is mounted at a desired accessible location, typically near box 10. Wires 61 extending from and connected to valves 52 are threaded through at least one grommet 27 and are connected to the control box. More than one wire opening 26 and/or grommet can be formed in box 10. An opening-formed by removing a knock-out 20 can be shaped to receive both a conduit 54 and wiring 61. The configured box 10 is partially buried in the manner illustrated in FIG. 5. A marker panel or panels 41 are attached to the lid 11 of box 10.

Box 10 can be provided in multiple sections. For example, valve-electrical box 10 can come in halves separated along a dashed line 70 (FIG. 1) lying in a vertical plane, or, can come in halves separated along a dashed line 71 lying in a horizontal plane.

In FIG. 1, box 10 is generally orthogonal. The shape of box 10 can vary as desired. Box 10 can be circular, trapezoidal, etc.

One advantage of the valve-electrical box 10 used in the invention is that knock-outs 20 to 22 permit the number of valves used in the box 10 to vary such that box 10 can be utilized with multiple valve configurations.

Another advantage of the valve-electrical box 10 is that seals 30 automatically seal openings in the box 10 without requiring the use of tape or other sealing material.

A further advantage of box 10 is that each seal 30 can accommodate elastically and/or pliably conduits having different diameters.

Still another advantage of the box 10 is that perforate bottom panel 24 permits water to drain from box 10 while minimizing the ingress of soil. This functions to keep valves, wiring, and associated components clean and minimizes valve maintenance.

Still a further advantage of the box 10 is that filter material 26 can be formed to prevent the ingress of soil, insects, rodents, lizards, snakes, etc. into the box via the bottom of the box.

Yet another advantage of box 10 is that it can be readily made in larger sizes with increased numbers of knock-outs or other openings needed to connect multiple valve configurations housed in box 10.

Yet a further advantage of box 10 is that marker panels 41 facilitate the identification and location of a box 10 during maintenance and repair of valves and other associated components located in the box 10.

Yet still another advantage of box 10 is that it can be readily fabricated using existing manufacturing processes and materials.

Having described my invention in such terms as to enable those of skill in the art to make and practice it, and having described the presently preferred embodiments thereof, I claim:

1. A method for installing a landscape watering system comprising the steps of
   (a) providing a plurality of water conduits;
   (b) providing a plurality of valves to direct water into said conduits;

(c) providing control apparatus to open and close said valves;

(d) providing electrical lines to send signals to said valves to open and close said valves;

(e) providing a valve-electric box including
 (i) a plurality of sides,
 (ii) a plurality of openings formed in at least one of said
 (iii) an elastic pliable seal in each of said openings, said seal including a circular opening formed therethrough, said circular opening having a seal diameter, said seal elastically sealingly distending when a conduit having a conduit diameter greater than said seal diameter is passed through said opening, each of said water conduits in step (a) having a diameter greater than said seal diameter, and
 (iv) a lid;

(f) excavating a hole in the ground;

(g) positioning said box in said hole;

(h) positioning said valves in said box;

(i) extending a first one of said conduits through a first selected one of said openings such that said seal in said opening is sealingly elastically distended;

(j) connecting a first one of said valves to said first one of said conduits;

(k) extending a second one of said conduits through a second selected one of said openings such that said seal in said second selected opening is sealingly elastically distended;

(l) connecting a second one of said valves to said second one of said conduits;

(m) connecting said control apparatus to said first and second valves;

(n) partially burying said box in the ground such that said lid can be removed to access said valves.

2. A method for installing a landscape watering system comprising the steps of
(a) providing a plurality of water conduits;
(b) providing a plurality of valves to direct water into said conduits;
(c) providing control apparatus to open and close said valves;
(d) providing electrical lines to send signals to said valves to open and close said valves;
(e) providing a valve-electric box including
 (i) a plurality of sides,
 (ii) a plurality of openings formed in at least one of said sides,
 (iii) a lid,
 (iv) a perforate bottom to permit water to drain from the box while minimizing the ingress of soil;
(f) excavating a hole in the ground;
(g) positioning said box in said hole;
(h) positioning said valves in said box above said perforate bottom;
(i) extending a first one of said conduits through a first selected one of said openings such that said opening is substantially sealed;
(j) connecting a first one of said valves to said first one of said conduits;
(k) extending a second one of said conduits through a second selected one of said openings such that said second selected opening is substantially sealed;

(l) connecting a second one of said valves to said second one of said conduits;
(m) connecting said control apparatus to said first and second valves;
(n) directing said electrical lines through one of said openings into said box; and,
(o) partially burying said box in the ground such that said lid can be removed to access said valves.

3. The method of claim 2 wherein in step (e)(iv) said perforate bottom includes a water permeable filter material affixed to said bottom to impede the passage of soil through said perforate bottom.

4. The method of claim 2 wherein
(a) in step (e) said valve-electric box includes a lower edge (55) and said perforate bottom is spaced above said lower edge, and
(b) in step (g) said box is positioned in said hole such that said perforate bottom is spaced above the ground to facilitate the drainage of water from inside said box and to reduce the likelihood that soil will pass through said perforate bottom into said box.

5. A method for installing a landscape watering system comprising the steps of
(a) providing a plurality of water conduits;
(b) providing a plurality of valves to direct water into said conduits;
(c) providing control apparatus to open and close said valves;
(d) providing electrical lines to send signals to said valves to open and close said valves;
(e) providing a valve-electric box including
 (i) a plurality of sides,
 (ii) a plurality of sealable openings formed in at least one of said sides,
 (iii) a lid (11) having an outer top surface,
 (iv) a marker member affixed to said outer top surface;
(f) excavating a hole in the ground;
(g) positioning said box in said hole;
(h) positioning said valves in said box;
(i) extending a first one of said conduits through a first selected one of said sealable openings such that said opening is substantially sealed;
(j) connecting a first one of said valves to said first one of said conduits;
(k) extending a second one of said conduits through a second selected one of said sealable openings such that said second selected opening is substantially sealed;
(l) connecting a second one of said valves to said second one of said conduits;
(m) connecting said control apparatus to said first and second valves;
(n) partially burying said box in the ground such that said lid can be removed to access said valves;
(o) providing a first designation to identify said box;
(p) providing a second designation to identify the location of said box; and,
(q) inscribing said first and second designations on said marker member.

6. The method of claim 5 wherein in step (e)(iv) said box includes a perforate bottom and a water permeable filter material affixed to said bottom to impede the passage of soil through said perforate bottom.

7. The method of claim 6 wherein
(a) in step (e) said valve-electric box includes a lower edge (55) and said perforate bottom is spaced above said lower edge, and
(b) in step (g) said box is positioned in said hole such that said perforate bottom is spaced above the ground to facilitate the drainage of water from inside said box and to reduce the likelihood that soil will pass through said perforate bottom into said box.

8. The method of claim 6 wherein
(a) in step (e) each of said openings includes an elastic pliable seal, said seal including a circular opening formed therethrough, said circular opening having a seal diameter, said seal elastically sealingly distending when a conduit having a conduit diameter greater than said seal diameter is passed through said opening;
(b) in step (a) each of said water conduits has a diameter greater than said seal diameter; and
(c) in step (i) extending a first one of said conduits through a first selected one of said openings sealingly elastically distends said seal in said opening.

9. The method of claim 5 including the additional step of providing a list including said first and second designations.

* * * * *